United States Patent
Hummel

(10) Patent No.: US 11,545,302 B2
(45) Date of Patent: Jan. 3, 2023

(54) MOLD FOR FORMING A RADIO FREQUENCY (RF) COIL FOR A PLASMA PROCESSING APPARATUS

(71) Applicant: Tokyo Electron Limited, Tokyo (JP)

(72) Inventor: Michael Hummel, Austin, TX (US)

(73) Assignee: Tokyo Electron Limited, Tokyo (JP)

( * ) Notice: Subject to any disclaimer, the term of this patent is extended or adjusted under 35 U.S.C. 154(b) by 323 days.

(21) Appl. No.: 16/752,446

(22) Filed: Jan. 24, 2020

(65) Prior Publication Data
US 2021/0233706 A1 Jul. 29, 2021

(51) Int. Cl.
| | |
|---|---|
| *H01F 7/06* | (2006.01) |
| *H01F 41/04* | (2006.01) |
| *B29C 41/40* | (2006.01) |
| *B29C 64/141* | (2017.01) |

(52) U.S. Cl.
CPC .......... *H01F 41/04* (2013.01); *B29C 41/40* (2013.01); *B29C 64/141* (2017.08)

(58) Field of Classification Search
CPC ....... B29C 41/40; B29C 64/141; H01F 41/04; B33Y 80/00
See application file for complete search history.

(56) References Cited

U.S. PATENT DOCUMENTS

| | | | | |
|---|---|---|---|---|
| 4,109,224 A | * | 8/1978 | Liautaud | H01F 5/02 343/715 |
| 4,170,014 A | * | 10/1979 | Sully | H01Q 9/30 336/208 |
| 6,842,101 B2 | * | 1/2005 | Maguire | H01F 21/065 336/198 |
| 7,372,351 B2 | * | 5/2008 | Ikeda | H01F 27/29 336/83 |

(Continued)

FOREIGN PATENT DOCUMENTS

| | | |
|---|---|---|
| EP | 3553797 A1 | 10/2019 |
| KR | 101450789 B1 | 10/2014 |
| WO | 2019079756 A1 | 4/2019 |

OTHER PUBLICATIONS

Queral, Vincente. "Construction Concepts and Validation of the 3D Printed UST_2 Modular Stellarator." Journal of Physics: Conference Series, vol. 591, 2015, p. 012015., doi:10.1088/1742-6596/591/1/012015.

(Continued)

*Primary Examiner* — Paul D Kim
(74) *Attorney, Agent, or Firm* — Slater Matsil, LLP

(57) ABSTRACT

Various embodiments of molds and methods are disclosed herein for fabricating a radio frequency (RF) coil. The disclosed mold includes a cylindrical inner core having a first helically shaped groove formed within an outer surface of the cylindrical inner core, and a two-piece compression sleeve having a second helically shaped groove formed (Continued)

within an inner surface of the two-piece compression sleeve. When portions of the two-piece compression sleeve are attached together, the two-piece compression sleeve surrounds the cylindrical inner core and provide a compressive force to a conductor arranged within the first and second helically shaped grooves to fabricate the RF coil. In some embodiments, a three-dimensional (3D) printing process may be used to fabricate each piece of the mold separately.

15 Claims, 6 Drawing Sheets

(56) References Cited

U.S. PATENT DOCUMENTS

2011/0248894 A1　10/2011　Crowley et al.
2014/0225302 A1　　8/2014　Kim

OTHER PUBLICATIONS

"Quality Electrodynamics 3D Printing Case Study." Stratasys, 2008, www.stratasys.com/resources/search/case-studies/quality-electrodynamics.
PCT International Search Report and Written Opinion, PCT Application No. PCT/US2020/057284, dated Feb. 15, 2021, 9 pages.

* cited by examiner

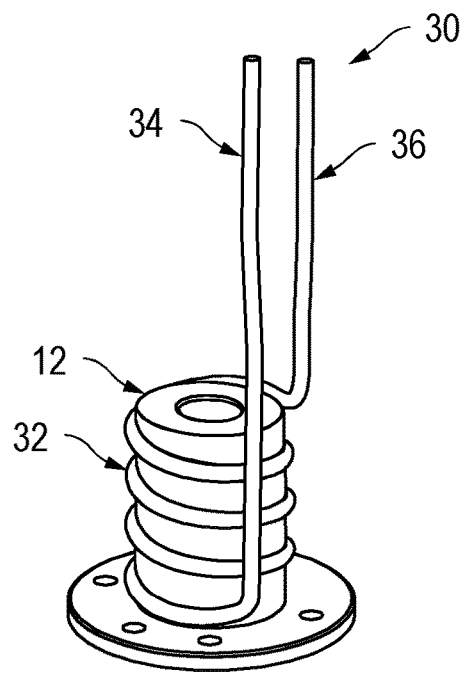
FIG. 4
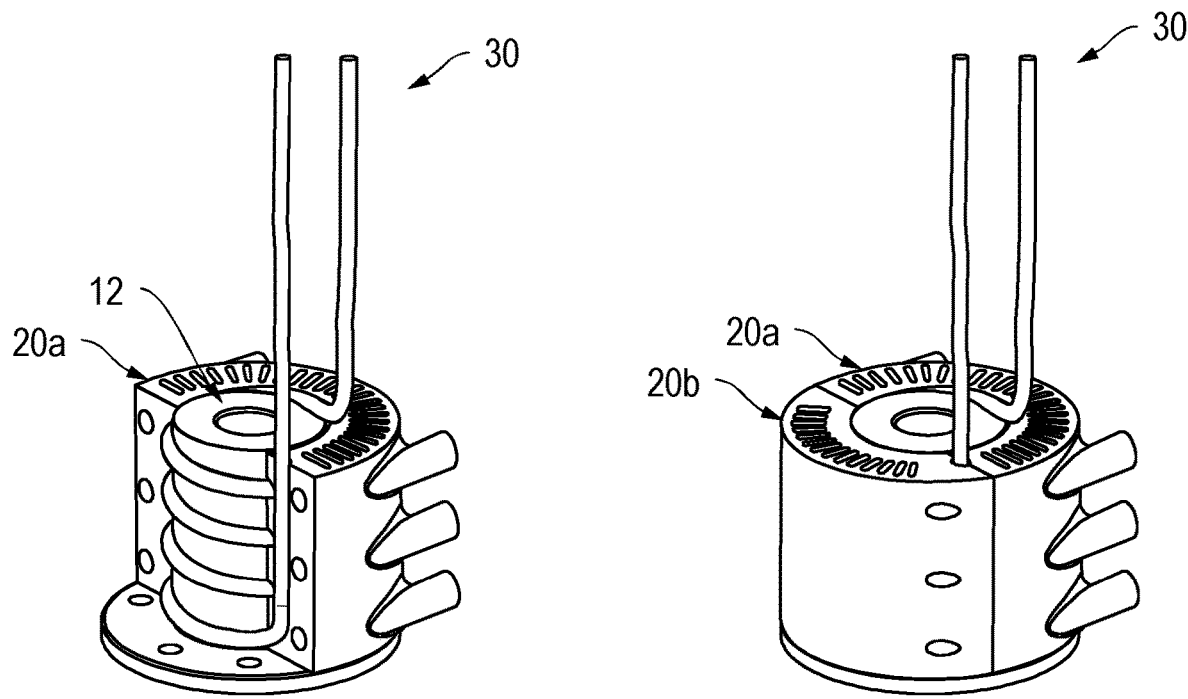
FIG. 5
FIG. 6

MOLD FOR FORMING A RADIO FREQUENCY (RF) COIL FOR A PLASMA PROCESSING APPARATUS

BACKGROUND

The present disclosure relates to radio frequency (RF) coils for use in a plasma processing apparatus. In particular, it provides various embodiments of molds and methods of forming an RF coil.

Plasma processing apparatuses are used extensively in the fabrication of semiconductor devices and other electronic devices. In such apparatuses, a plasma is used to perform a process, such as etching, deposition, oxidation, sputtering, etc. so as to achieve a good reaction of a processing gas at a relatively low temperature. Conventional plasma processing apparatuses used for such purposes include, but are not limited to, capacitively coupled plasma (CCP) and inductively coupled plasma (ICP) apparatuses.

Generally, plasmas are generated in a vacuum chamber and the means for generating the plasma are either located outside the chamber, or within a protective wall, to reduce the disturbance to the plasma potential when RF power is applied. In an inductively coupled plasma (ICP) apparatus, for example, a coil-shaped RF antenna may be positioned outside of a dielectric window formed within a wall of a processing chamber, which serves as a vacuum chamber for the generated plasma. A target substrate (for example, a semiconductor wafer or a glass substrate) is provided at a central region within the processing chamber.

To perform a plasma process, a processing gas is supplied into a processing space formed between the dielectric window and the substrate. A high frequency alternating current (AC) current is supplied to the coil-shaped RF antenna to induce an RF magnetic field, which is transmitted to the processing space within the chamber via the dielectric window. As the RF magnetic field changes with time, an inductive electric field is generated in an azimuth direction within the processing space to create an intense plasma.

In some cases, characteristics of the coil-shaped RF antenna (e.g., number of turns, pitch, bend radius, coil diameter, coil length, coil concentricity, etc.) may be altered to affect plasma density and repeatability. For example, varying the geometry of the coil will impact the plasma characteristics, based on varying features such as pitch, diameter, length, etc. (e.g., an increase in the pitch of the coil will change the plasma generation region, the plasma density, and the plasma uniformity).

RF coil designs are typically sent to an outside vendor for fabrication via a manufacturing process, which includes a combination of hand bending and winding machinery. Unfortunately, fabricating an RF coil by hand (with or without the aid of winding machinery) is not very accurate, and often fails to achieve the tight tolerances demanded by the plasma process. The manufacturing process also tends to create uneven surfaces and warped geometries (e.g., deformed coil shapes), which may influence the near field behavior of the fabricated RF coil.

In some cases, several iterations may be needed to perfect the RF coil design. For example, the tight bend radius, coil concentricity and coil diameter are especially difficult to predict and may need to be adjusted throughout the design process. Even small deviations from concentricity, for example, can lead to non-uniformity, poor ignition behavior or anomalous discharge in the plasma process. However, many outside vendors have long lead times (e.g., about 4-6 weeks), which may significantly increase design time, especially when multiple iterations are needed to perfect the RF coil design.

A need exists for an improved method of fabricating RF coils that is accurate, reproducible and more time/cost effective than conventional manufacturing processes.

SUMMARY

Various embodiments of molds and methods for fabricating a RF coil are disclosed herein. More specifically, the present disclosure provides various embodiments of molds and methods to fabricate an RF coil for use within a plasma processing apparatus. As described in more detail below, the disclosed mold may generally include a cylindrical inner core having a first helically shaped groove formed within an outer surface of the cylindrical inner core, and a two-piece compression sleeve having a second helically shaped groove formed within an inner surface of the two-piece compression sleeve. When portions of the two-piece compression sleeve are attached together, the two-piece compression sleeve surrounds the cylindrical inner core and provide a compressive force to a conductor arranged within the first and second helically shaped grooves to fabricate the RF coil.

In some embodiments, a three-dimensional (3D) printing process may be used to fabricate each piece of the mold separately. By using a 3D printing process to fabricate the mold disclosed herein, the present disclosure provides a method for fabricating an RF coil that is accurate, reproducible and more time/cost effective than conventional manufacturing processes.

According to one embodiment, a mold for fabricating an RF coil for use within a plasma processing apparatus may generally include a cylindrical inner core and a two-piece compression sleeve. The cylindrical inner core may have a first helically shaped groove formed within an outer surface of the cylindrical inner core, and the two-piece compression sleeve may have a second helically shaped groove formed within an inner surface of the two-piece compression sleeve. When portions of the two-piece compression sleeve are attached together, the two-piece compression sleeve may be configured to surround the cylindrical inner core and provide a compressive force to a conductor arranged within the first and second helically shaped grooves to fabricate the RF coil. In some embodiments, the conductor may include ferrous and non-ferrous metals, including for example, but not limited to, copper, aluminum or iron.

In some embodiments, the two-piece compression sleeve comprises a first portion and a second portion, which is removably attached to the first portion with one or more mechanical fasteners. In some embodiments, the two-piece compression sleeve may comprise cope and drag parts that facilitate the negative shape of the part to be formed and the forming of the part to the desired shape. (e.g. the cavity diameter, outer coil diameter, and coil pitch, etc.)

In some embodiments, the mold may be shaped and dimensioned to form an RF coil for use within a plasma processing apparatus. In such embodiments, the cylindrical inner core may have a height between ⅛ inch and 12 inches, a diameter between ⅛ inches and 24 inches, a number of turns between 1 and 100 and a pitch between ⅛ inch and 2 inches.

In some embodiments, the mold may be fabricated by using a three-dimensional (3D) printing process to separately fabricate each piece of the mold. For example, the cylindrical inner core, the first portion of the two-piece compression sleeve and the second portion of the two-piece compression sleeve may each be fabricated, in some embodiments, by 3D printing a thermoplastic polymer material having a glass transition temperature above 100° C. and a compressive strength above 200 megapascal (MPa). In other embodiments, other materials (for example, but not limited to, carbon fiber-PC, carbon fiber, aluminum, stainless steel, Inconel, etc.) have the ability to be 3D printed and may be used. The metals generally are stronger, and will provide a better, more consistent final shape.

According to another embodiment, a method for forming an RF coil for use within a plasma processing apparatus is provided. In some embodiments, the method may begin by using a 3D printing process to fabricate a mold comprising a cylindrical inner core and a two-piece compression sleeve, wherein a first helically shaped groove is formed within an outer surface of the cylindrical inner core and a second helically shaped groove is formed within an inner surface of the two-piece compression sleeve. The method may also include winding a portion of a conductor around the cylindrical inner core, so that the portion of the conductor is arranged within the first helically shaped groove. The method may further include applying the two-piece compression sleeve to the cylindrical inner core, so that the two-piece compression sleeve surrounds the cylindrical inner core and provides a compressive force to the portion of the conductor arranged within the first and second helically shaped grooves to form the RF coil.

In some embodiments, said using a 3D printing process to fabricate the mold may include using the 3D printing process to separately fabricate each piece of the mold. For example, the cylindrical inner core, the first portion of the two-piece compression sleeve and the second portion of the two-piece compression sleeve may each be fabricated, in some embodiments, by 3D printing a thermoplastic polymer material having a glass transition temperature above 100° C. and a compressive strength above 200 MPa. In other embodiments, other materials In other embodiments, other materials (for example, but not limited to, carbon fiber-PC, carbon fiber, aluminum, stainless steel, Inconel, etc.) have the ability to be 3D printed and may be used. The metals generally are stronger, and will provide a better, more consistent final shape.

In some embodiments, said using a 3D printing process to fabricate the mold may include using the 3D printing process to form the cylindrical inner core to have a height between ⅛ inch and 12 inches, a diameter between ⅛ inches and 24 inches, a number of turns between 1 and 100 and a pitch between ⅛ inch and 2 inches.

In some embodiments, said applying the two-piece compression sleeve may include applying a first portion of the two-piece compression sleeve to a first side of the cylindrical inner core, and applying a second portion of the two-piece compression sleeve to a second side of the cylindrical inner core, so that the second portion and the first portion surround the cylindrical inner core and the portion of the conductor. In some embodiments, said applying the two-piece compression sleeve may also include attaching the first portion to the second portion with one or more mechanical fasteners to apply the compressive force to the portion of the conductor arranged within the first and second helically shaped grooves.

In some embodiments, the method may further include removing the one or more mechanical fasteners, removing the first and second portions of the two-piece compression sleeve from the cylindrical inner core and the RF coil, and removing the RF coil from the mold by rotating at least one of the RF coil or the cylindrical inner core with respect to each other.

According to another embodiment, a method for forming an RF coil for use within a plasma processing apparatus is provided. In some embodiments, the method may begin by fabricating a mold comprising a cylindrical inner core and a two-piece compression sleeve, so that a first helically shaped groove is formed within an outer surface of the cylindrical inner core and a second helically shaped groove is formed within an inner surface of the two-piece compression sleeve. The method may also include winding a portion of a conductor around the cylindrical inner core, so that the portion of the conductor is arranged within the first helically shaped groove, and applying the two-piece compression sleeve to the cylindrical inner core, so that the two-piece compression sleeve surrounds the cylindrical inner core and provides a compressive force to the portion of the conductor arranged within the first and second helically shaped grooves to form the RF coil. The method may further include removing the two-piece compression sleeve from the cylindrical inner core and the RF coil, and removing the RF coil from the mold by rotating at least one of the RF coil or the cylindrical inner core with respect to each other.

In some embodiments, said applying the two-piece compression sleeve may include applying a first portion of the two-piece compression sleeve to a first side of the cylindrical inner core, and applying a second portion of the two-piece compression sleeve to a second side of the cylindrical inner core, so that the second portion and the first portion surround the cylindrical inner core and the portion of the conductor. In some embodiments, said applying the two-piece compression sleeve may further include attaching the first portion to the second portion with one or more mechanical fasteners to apply the compressive force to the portion of the conductor arranged within the first and second helically shaped grooves. In such embodiments, said removing the two-piece compression sleeve may include removing the one or more mechanical fasteners, and removing the first and second portions of the two-piece compression sleeve from the cylindrical inner core and the RF coil.

BRIEF DESCRIPTION OF THE DRAWINGS

A more complete understanding of the present inventions and advantages thereof may be acquired by referring to the following description taken in conjunction with the accompanying drawings, in which like reference numbers indicate like features. It is to be noted, however, that the accompanying drawings illustrate only exemplary embodiments of the disclosed concepts and are therefore not to be considered limiting of the scope, for the disclosed concepts may admit to other equally effective embodiments.

FIGS. 4, 5, 6, 7, 8, 9 and 10 are perspective, three-dimensional views of the mold shown in FIG. 1, illustrating

DETAILED DESCRIPTION

Various embodiments of molds and methods for fabricating a RF coil are disclosed herein. More specifically, the present disclosure provides various embodiments of molds and methods to fabricate an RF coil for use within a plasma processing apparatus. As described in more detail below, the disclosed mold may generally include a cylindrical inner core having a first helically shaped groove formed within an outer surface of the cylindrical inner core, and a two-piece compression sleeve having a second helically shaped groove formed within an inner surface of the two-piece compression sleeve. When portions of the two-piece compression sleeve are attached together, the two-piece compression sleeve surrounds the cylindrical inner core and provide a compressive force to a conductor arranged within the first and second helically shaped grooves to fabricate the RF coil. As discussed herein, "cylindrical" structures are described. As used herein, "cylindrical" encompasses cylindrical like structures that have radius variations of 20% or less from a perfect cylindrical shaped structure.

In some embodiments, a three-dimensional (3D) printing process may be used to fabricate each piece of the mold separately. By using a 3D printing process to fabricate the mold disclosed herein, the present disclosure provides a method for fabricating an RF coil that is accurate, reproducible and more time/cost effective than conventional manufacturing processes.

Figure 1:
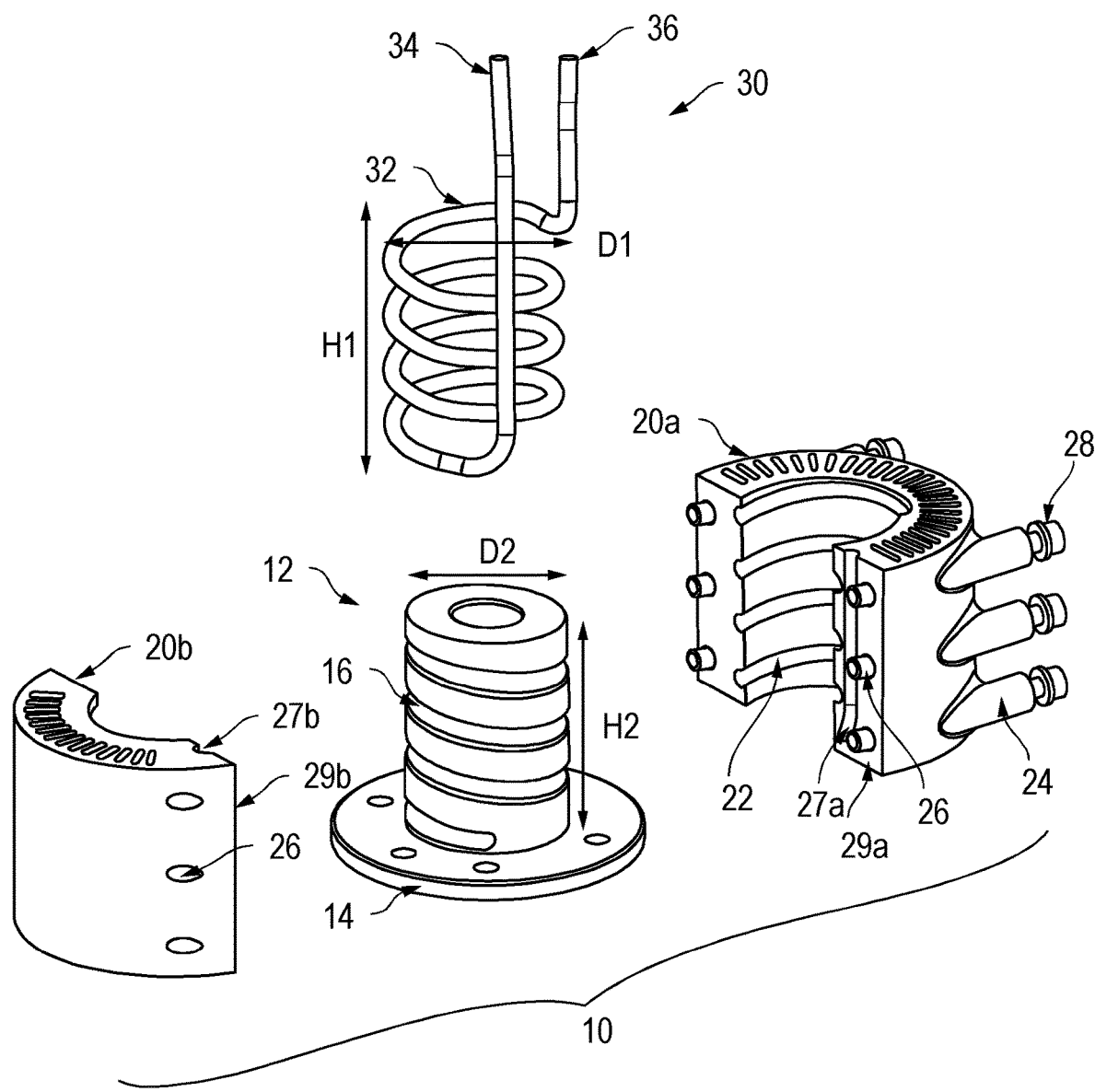
FIG. 1 is a perspective, three-dimensional view of a mold for fabricating a RF coil, according to one embodiment of the present disclosure.

FIG. 1 illustrates one embodiment of a mold 10 that may be used to fabricate an RF coil for use within a plasma processing apparatus. As shown in FIG. 1, the mold 10 may include a cylindrical inner core 12 and a two-piece compression sleeve comprised of a first portion 20a and a second portion 20b. The cylindrical inner core 12 may include a base plate 14 at one end thereof, and first helically shaped grooves 16 formed within an outer surface of the cylindrical inner core 12. The two-piece compression sleeve may include second helically shaped grooves 22 formed within an inner surface of the two-piece compression sleeve and means for attaching (e.g., attachment guides 24 and holes 26) portions of the two-piece compression sleeve together. When the first portion 20a and a second portion 20b of the two-piece compression sleeve are attached together, the two-piece compression sleeve surrounds the cylindrical inner core 12 and provides a compressive force to a conductor 30 arranged within the first helically shaped grooves 16 and the second helically shaped grooves 22 to fabricate the RF coil.

Figure 7:
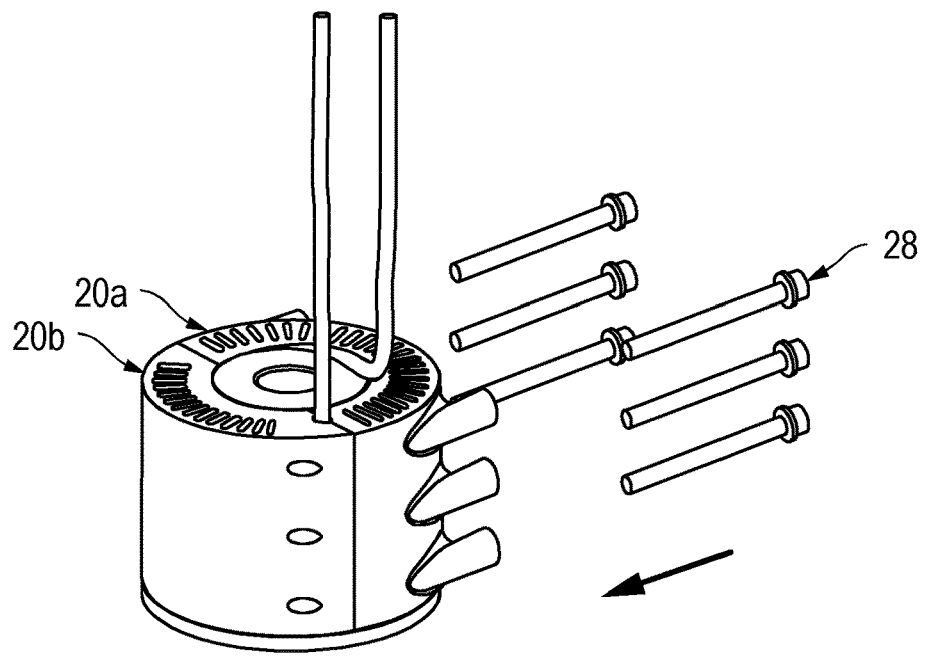
Figure 8:
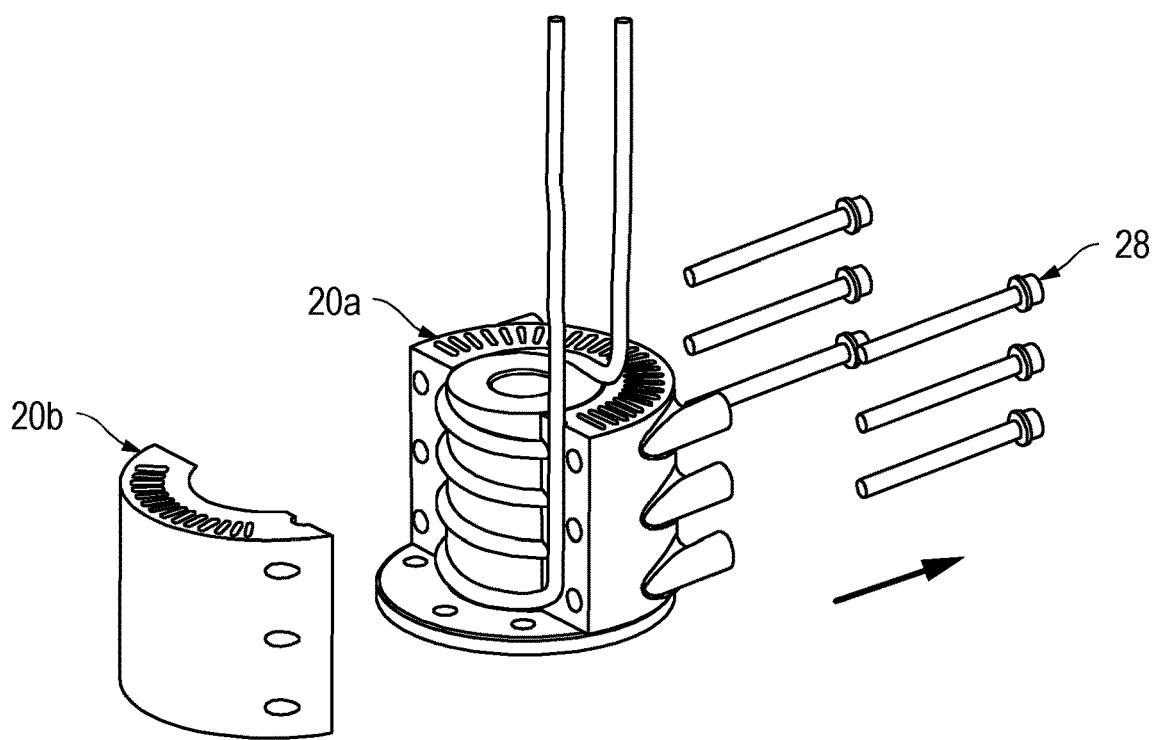

As shown in FIG. 1, the two-piece compression sleeve includes a first portion 20a and a second portion 20b, which can be attached to and removed from the first portion with the aid of one or more mechanical fasteners 28. In some embodiments, the first portion 20a may be attached to the second portion 20b (or vice versa) by inserting one or more mechanical fasteners 28 (e.g., bolts and washers) within the attachment guides 24 and holes 26 formed within the two-piece compression sleeve, as shown in FIG. 7. When the one or more mechanical fasteners 28 are subsequently tightened, the two-piece compression sleeve provides a compressive force to the conductor 30 to conform the conductor to the shape and dimensions desired for the RF coil. To remove the RF coil from the mold 10, the one or more mechanical fasteners 28 may be removed from the attachment guides 24 and holes 26, so that the first portion 20a can be removed from the second portion 20b (or vice versa), as shown in FIG. 8.

It is recognized that, although particular means (e.g., attachment guides 24, holes 26 and mechanical fasteners 28) are illustrated and described herein for attaching the first portion 20a and the second portion 20b of the two-piece compression sleeve together, alternative means of attachment could be used to provide the compressive force necessary to form the RF coil. For example, sandwiching the assembly in a vice to provide a stronger, more uniform compressive force would be one way, or using a mold type frame to allow the parts to be used in a hydraulic press could be used.

The mold 10 may generally be designed to produce an RF coil having particular characteristics (e.g., shape, size, pitch, length, etc.). For example, many RF coil designs are driven by physics-based RF/electromagnetic (EM) simulations, which determine the best coil shape, size, pitch, length, etc. for a specific application. Once an RF coil design is selected for a particular application, characteristics of the RF coil design may be used to design and fabricate the mold 10.

For example, RF coils used in plasma processing apparatuses are typically formed to have a height (H1) between ⅛ inch and 12 inches, a diameter (D1) between ⅛ inch and 24 inches, a number of turns between 1 and 100, and a pitch between ⅛ inch and 2 inches. Any one of these characteristics may be adjusted to alter the electric field generated by the RF coil and the plasma generated within the plasma processing apparatus. For example, the height of the RF coil and the diameter may be adjusted. On the other hand, the number of turns used within the RF coil, and/or the pitch between turns, may also be adjusted. Changing the size and shape of the coil will change the electric field and inductance of the coil, which in turn changes the plasma density.

To form an RF coil for use in a plasma processing apparatus, the inner core 12 of the mold 10 may be formed with a height (H2) between ¼ inch and 8 inches and a diameter (D2) between ¼ inch and 24 inches. As shown in FIG. 1, the height (H2) is measured between an upper surface of the base plate 14 and an uppermost surface of the cylindrical inner core 12. The diameter (D2) is measured across the uppermost surface of the cylindrical inner core 12. In addition, the first helically shaped grooves 16 formed within the cylindrical inner core 12 and the second helically shaped grooves 22 formed within each portion of the two-piece compression sleeve may each include a number of turns between 1 and 100. Although not shown in FIG. 1, the depth of the first helically shaped grooves 16 and depth of the second helically shaped grooves 22 may each be substantially equal to one-half of the diameter of the conductor 30.

Conductor 30 may generally be formed from substantially any electrically conductive material. In some embodiments, conductor 30 may be a ferrous or non-ferrous metal, including but not limited to, copper, aluminum, or iron.

When the two-piece compression sleeve 20 is applied to the cylindrical inner core 12, and the first portion 20a and the second portion 20b are attached together via mechanical fastener(s) 28, the compressive force applied to the conductor 30 causes the conductor to conform to the shape and dimensions of the first helically shaped grooves 16 and second helically shaped grooves 22. By applying a compressive force to the conductor 30 positioned within the first helically shaped grooves 16 and the second helically shaped grooves 22, an RF coil is formed having a helically shaped coil portion 32 and two substantially straight end portions, straight end portion 34 and straight end portion 36. As noted above, the shape and dimensions of the helically shaped coil portion 32 are generally dependent on the characteristics of the mold 10 used to form the coil. In one embodiment, for example, the helically shaped coil portion 32 may be formed, so as to have a height (H1) between ¼ inch and 8 inches, a diameter (D1) between 1 inch and 24 inches, a number of turns between 1 and 100, and a pitch between ⅝ inch and 2 inches.

In some embodiments, the first portion 20a and the second portion 20b of the two-piece compression sleeve may include an additional groove 27a and additional groove 27b, respectively, formed within an abutment surface 29a and abutment surface 29b, respectively, to accommodate and/or support one of the substantially straight end portions (e.g., 34). In other embodiments, the additional grooves may be omitted, for example, if the base plate 14 was removed and the substantially straight end portion 34 was made to extend in the opposite direction.

In some embodiments, the two-piece compression sleeve may include cope and drag parts that facilitate the negative shape of the part to be formed and the forming of the part to the desired shape. (e.g. the cavity diameter, outer coil diameter, and coil pitch, etc.). The compression sleeve prevents uneven surfaces and warped geometries (e.g., deformed coil shapes) in the RF coil when the compressive force is applied to the conductor 30.

As noted above, RF coils are typically made by outside vendors, which fabricate the RF coils through a combination of handing, bending, and winding machinery. Unfortunately, the manufacturing methods utilized by most outside vendors lack accuracy and tend to create uneven surfaces and warped geometries (e.g., deformed coil shapes), which may influence the near field behavior of the RF coil. In addition, many outside vendors have long lead times (e.g., about 4-6 weeks), which significantly increase design time, especially when multiple iterations are needed to perfect the RF coil design.

To overcome these problems, the mold 10 shown in FIG. 1 is preferably formed using a three-dimensional (3D) printing process. 3D printing is an additive manufacturing process that uses Computer Aided Design (CAD) software to direct hardware to deposit material, layer upon layer, in precise geometric shapes, and can be used to make 3D objects quickly, accurately, and at low cost. In general, each piece of the mold 10 (e.g., the cylindrical inner core 12, the first portion 20a and the second portion 20b of the two-piece compression sleeve) may be fabricated separately using a 3D printer.

In some embodiments, each piece of the mold 10 may be fabricated by instructing a 3D printer to deposit a thermoplastic polymer material, layer upon layer, until the cylindrical inner core 12, the first portion 20a and the second portion 20b are formed to the desired specifications. Although substantially any thermoplastic polymer material could be used in the 3D printing process, a thermoplastic polymer material having a glass transition temperature (Tg) above 100° C. and a compressive strength above 200 MPa may be preferred in at least some embodiments. In one embodiment, a carbon fiber polycarbonate material having a Tg of about 147° C. and a compressive strength of about 320 MPa may be used to form the cylindrical inner core 12, the first portion 20a and the second portion 20b of the two-piece compression sleeve of the mold 10.

During a design phase, a mold 10 was initially constructed using polylactic acid or polylactide (PLA), which has a substantially lower Tg (about 55-60° C.) and compressive strength (about 94 MPa) than carbon fiber polycarbonate. When the PLA mold was subsequently used to form an RF coil, the PLA mold deformed near the RF coil area, most likely due to heat generated during the coil formation process or the compressive force need to form the coil. It was subsequently found that by using a carbon fiber polycarbonate material instead of PLA, the mold was able to withstand higher compressive forces and temperatures, thereby avoiding the deformation suffered by the PLA mold. Although carbon fiber polycarbonate was shown to produce a successful mold 10, and thus, a successful RF coil, other thermoplastic polymer materials having suitable glass transition temperatures and compressive strengths may also be used to form the mold. For example, suitable thermoplastic polymer materials may include a wide variety of materials, including but are not limited to, Kyron and MAX-XS.

It is noted that although a successful mold 10 was reduced to practice by 3D printing a thermoplastic polymer material to have the desired shape, form and dimensions, other materials could also be used to form the mold. For example, mold 10 may be alternatively formed by 3D printing metals such as, but not limited to, aluminum, stainless steel or Inconel.

Figure 2:
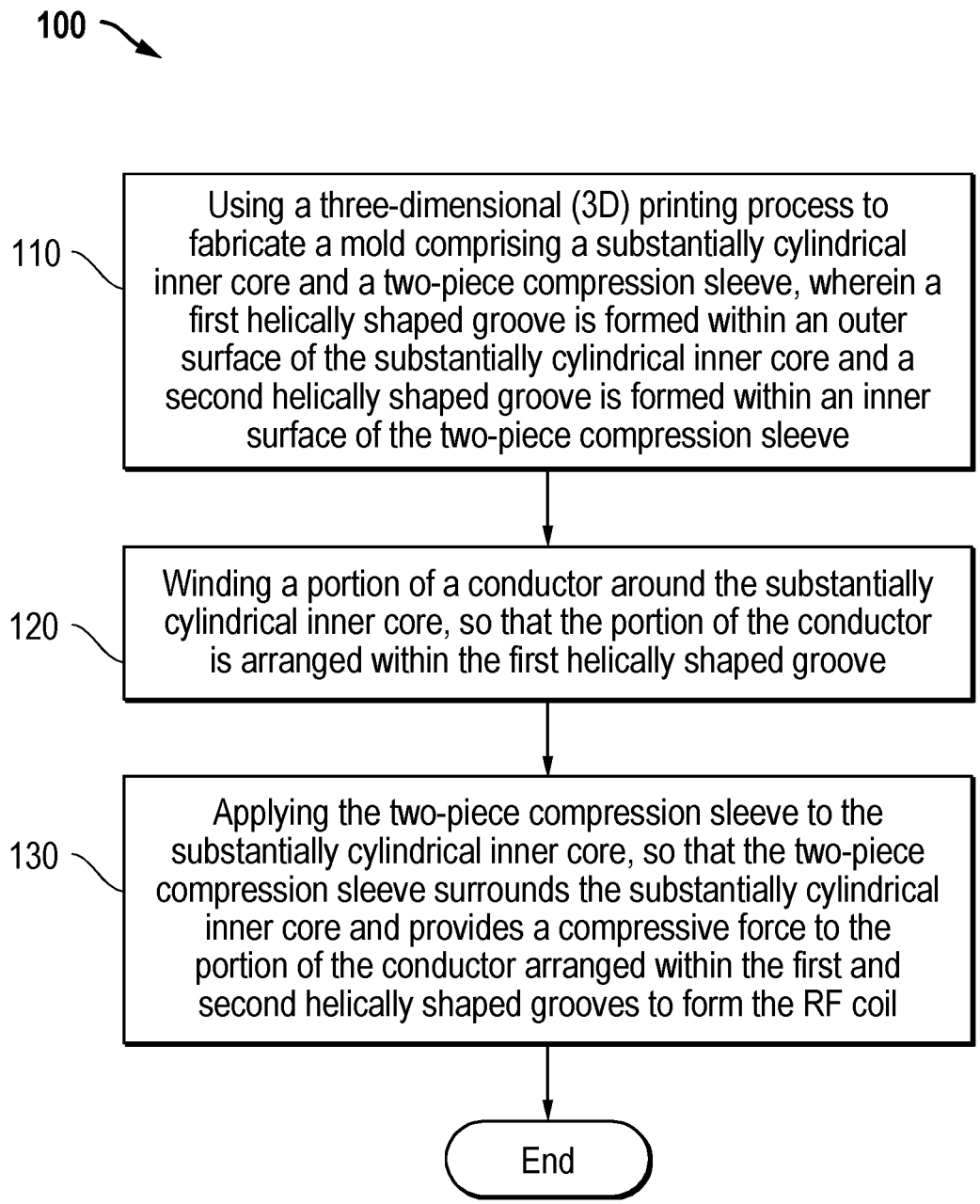
FIG. 2 is a flowchart diagram illustrating one embodiment of a method for forming an RF coil, in accordance with the present disclosure.
Figure 3:
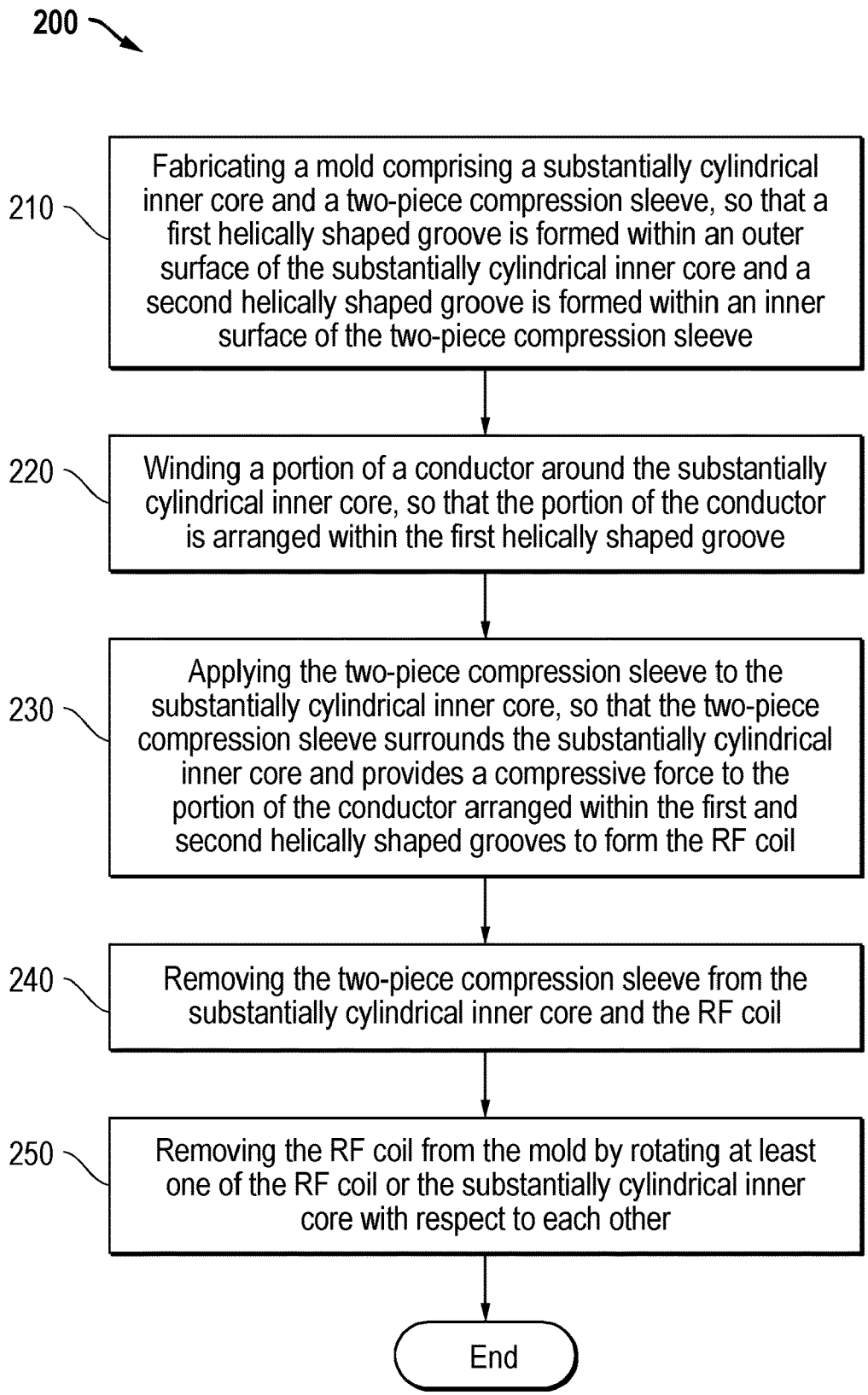
FIG. 3 is a flowchart diagram illustrating another embodiment of a method for forming an RF coil, in accordance with the present disclosure.

FIGS. 2-10 illustrate exemplary methods of forming an RF coil using the mold 10 shown in FIG. 1 and described above. In particular, FIGS. 2 and 3 are flowchart diagrams illustrating example embodiments of methods 100 and 200 that may be used to form an RF coil, in accordance with the present disclosure. FIGS. 4-10 illustrate how the mold 10 shown in FIG. 1 may be used to perform the method steps shown in FIGS. 2 and 3. Although the mold 10 shown in FIG. 1 and the methods 100 and 200 shown in FIGS. 2 and 3 are use to form an RF coil for use within a plasma processing apparatus, it is noted that a similar mold and/or similar methods may be used to form RF coils for other uses and applications.

It will be recognized that the embodiments of FIGS. 4-10 are merely exemplary and additional methods may utilize the techniques described herein. Further, additional steps may be added to the methods shown in the FIGS. 4-10 as the steps described are not intended to be exclusive. Moreover, the order of the steps is not limited to the order shown in the figures as different orders may occur and/or various steps may be performed in combination or at the same time.

FIG. 2 illustrates an exemplary method 100 of forming a RF coil for use within a plasma processing apparatus. In some embodiments, the method 100 shown in FIG. 2 may begin (in step 110) by using a 3D printing process to fabricate a mold comprising a cylindrical inner core and a two-piece compression sleeve, wherein a first helically shaped groove is formed within an outer surface of the cylindrical inner core and a second helically shaped groove is formed within an inner surface of the two-piece compression sleeve. Although not strictly limited to such, FIG. 1 illustrates one embodiment of a mold 10 that can be fabricated to include the above-mentioned structures using a 3D printing process.

In some embodiments, said using a 3D printing process to fabricate the mold (in step 110) includes using the 3D printing process to separately fabricate the cylindrical inner core 12, a first portion 20a of the two-piece compression sleeve and a second portion 20b of the two-piece compression sleeve using a thermoplastic polymer material having a glass transition temperature above 100° C. and a compressive strength above 200 MPa. As noted above, a variety of thermoplastic polymer materials may be used.

In some embodiments, said using a 3D printing process to fabricate the mold (in step 110) includes fabricating the cylindrical inner core 12 to have a height between ¼ inch and 8 inches and a diameter 1 inch and 24 inches, and fabricating the first and second helically shaped grooves 16/22 to have a number of turns between 1 and 100 and a pitch between ⅝ inch and 2 inches. As noted above, a mold 10 having such shapes and dimensions may be suitable for forming an RF coil for use in a plasma processing apparatus. In other embodiments, a mold fabricated using a 3D printing process may be used to form an RF coil that is suitable for other uses and applications.

In step 120, method 100 includes winding a portion of a conductor around the cylindrical inner core, so that the portion of the conductor is arranged within the first helically shaped groove. As shown in FIG. 4, for example, a portion of conductor 30 (e.g., a coil portion 32) may be wound around the cylindrical inner core 12 (in step 120), so that the portion of the conductor is arranged within the first helically shaped groove.

In step 130, method 100 includes applying the two-piece compression sleeve to the cylindrical inner core, so that the two-piece compression sleeve surrounds the cylindrical inner core and provides a compressive force to the portion of the conductor arranged within the first and second helically shaped grooves to form the RF coil. In some embodiments, said applying the two-piece compression sleeve (in step 130) may include applying a first portion 20a of the two-piece compression sleeve to a first side of the cylindrical inner core (as shown in FIG. 5), and applying a second portion 20b of the two-piece compression sleeve to a second side of the cylindrical inner core (as shown in FIG. 6), so that the second portion 20b and the first portion 20a surround the cylindrical inner core 12 and the portion of the conductor 30 (e.g., the coil portion 32). In some embodiments, said applying the two-piece compression sleeve (in step 130) may further include attaching the first portion 20a to the second portion 20b with one or more mechanical fasteners 28 to apply the compressive force to the portion of the conductor 30 arranged within the first and second helically shaped grooves (as shown in FIG. 7).

Figure 9:
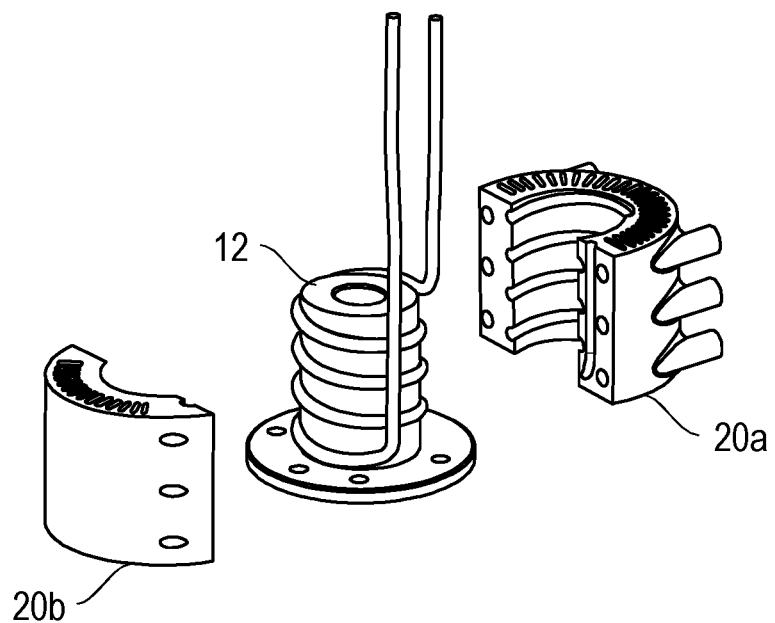
Figure 10:
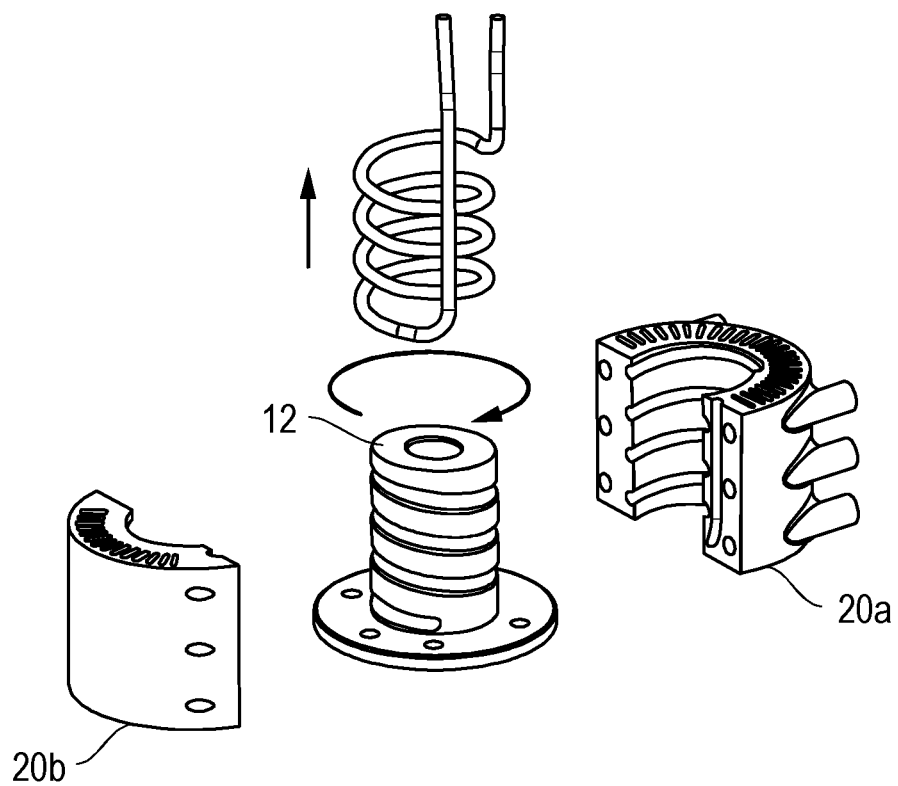

In some embodiments (not shown), method 100 may further include removing the one or more mechanical fasteners 28 (as shown in FIG. 8), removing the first portion 20a and the second portion 20b of the two-piece compression sleeve from the cylindrical inner core 12 and the RF coil (as shown in FIGS. 8 and 9), and removing the RF coil from the mold by rotating at least one of the RF coil or the cylindrical inner core 12 with respect to each other (as shown in FIG. 10).

FIG. 3 illustrates an exemplary method 200 of forming an RF coil for use within a plasma processing apparatus. In some embodiments, the method 200 shown in FIG. 3 may begin (in step 210) by fabricating a mold comprising a cylindrical inner core and a two-piece compression sleeve, so that a first helically shaped groove is formed within an outer surface of the cylindrical inner core and a second helically shaped groove is formed within an inner surface of the two-piece compression sleeve. In some embodiments, the mold may be fabricated (in step 210) using a 3D printing process, as described above. It is noted, however, that method step 210 is not strictly limited to a 3D printing process and could be performed using other suitable processes.

In step 220, method 200 includes winding a portion of a conductor around the cylindrical inner core, so that the portion of the conductor is arranged within the first helically shaped groove. As shown in FIG. 4, for example, a portion of conductor 30 (e.g., a coil portion 32) may be wound around the cylindrical inner core 12 (in step 220), so that the portion of the conductor is arranged within the first helically shaped groove.

In step 230, method 200 includes applying the two-piece compression sleeve to the cylindrical inner core, so that the two-piece compression sleeve completely surrounds the cylindrical inner core and provides a compressive force to the portion of the conductor arranged within the first and second helically shaped grooves to form the RF coil. In some embodiments, said applying the two-piece compression sleeve (in step 230) may include applying a first portion 20a of the two-piece compression sleeve to a first side of the cylindrical inner core (as shown in FIG. 5), and applying a second portion 20b of the two-piece compression sleeve to a second side of the cylindrical inner core (as shown in FIG. 6), so that the second portion 20b and the first portion 20a surround the cylindrical inner core 12 and the portion of the conductor 30 (e.g., the coil portion 32). In some embodiments, said applying the two-piece compression sleeve (in step 230) may further include attaching the first portion 20a to the second portion 20b with one or more mechanical fasteners 28 to apply the compressive force to the portion of the conductor 30 arranged within the first and second helically shaped grooves (as shown in FIG. 7).

In step 240, method 200 includes removing the two-piece compression sleeve from the cylindrical inner core and the RF coil. In some embodiments, for example, the two-piece compression sleeve may be removed from the cylindrical inner core 12 and the RF coil (in step 240) by removing the one or more mechanical fasteners 28 (as shown in FIG. 8) before removing the first portion 20a and the second portion 20b of the two-piece compression sleeve from the cylindrical inner core 12 and the RF coil (as shown in FIGS. 8 and 9).

In step 250, method 200 includes removing the RF coil from the mold by rotating at least one of the RF coil or the cylindrical inner core with respect to each other. As shown in FIG. 10, for example, the RF coil may be removed from the mold 10 (in step 250) by rotating the RF coil with respect to the cylindrical inner core 12 (or vice versa).

Further modifications and alternative embodiments of the inventions will be apparent to those skilled in the art in view of this description. Accordingly, this description is to be construed as illustrative only and is for the purpose of teaching those skilled in the art the manner of carrying out the inventions. It is to be understood that the forms and method of the inventions herein shown and described are to be taken as presently preferred embodiments. Equivalent techniques may be substituted for those illustrated and described herein and certain features of the inventions may be utilized independently of the use of other features, all as would be apparent to one skilled in the art after having the benefit of this description of the inventions.

What is claimed is:

1. A mold for fabricating a radio frequency (RF) coil for use within a plasma processing apparatus, the mold comprising:
 a cylindrical inner core having a first helically shaped groove formed within an outer surface of the cylindrical inner core; and
 a two-piece compression sleeve having a second helically shaped groove formed within an inner surface of the two-piece compression sleeve, wherein when portions of the two-piece compression sleeve are attached together, the two-piece compression sleeve is configured to surround the cylindrical inner core and provide a compressive force to a conductor arranged within the first and second helically shaped grooves to fabricate the RF coil.

2. The mold of claim 1, wherein the two-piece compression sleeve comprises a first portion and a second portion, which is removably attached to the first portion with one or more mechanical fasteners.

3. The mold of claim 1, wherein the two-piece compression sleeve comprises cope and drag compression sleeves which facilitate a negative shape of the RF coil to be formed.

4. The mold of claim 1, wherein the cylindrical inner core comprises a height between ⅝ inch and 8 inches and a diameter between 1 inch and 24 inches.

5. The mold of claim 1, wherein the first and second helically shaped grooves each comprise a number of turns between 1 and 100 and a pitch between ⅝ inch and 2 inches.

6. A mold for fabricating a radio frequency (RF) coil for use within a plasma processing apparatus, the mold comprising:
a cylindrical inner core having a first helically shaped groove formed within an outer surface of the cylindrical inner core; and
a two-piece compression sleeve having a second helically shaped groove formed within an inner surface of the two-piece compression sleeve, wherein when portions of the two-piece compression sleeve are attached together, the two-piece compression sleeve is configured to surround the cylindrical inner core and provide a compressive force to a conductor arranged within the first and second helically shaped grooves to fabricate the RF coil, wherein the cylindrical inner core and the two-piece compression sleeve are fabricated by three-dimensional (3D) printing a thermoplastic polymer material having a glass transition temperature above 100° C. and a compressive strength above 200 MPa.

7. The mold of claim 6, wherein the two-piece compression sleeve comprises a first portion and a second portion, which is removably attached to the first portion with one or more mechanical fasteners.

8. The mold of claim 6, wherein the two-piece compression sleeve comprises cope and drag compression sleeves which facilitate a negative shape of the RF coil to be formed.

9. The mold of claim 6, wherein the cylindrical inner core comprises a height between ⅝ inch and 8 inches and a diameter between 1 inch and 24 inches.

10. The mold of claim 6, wherein the first and second helically shaped grooves each comprise a number of turns between 1 and 100 and a pitch between ⅝ inch and 2 inches.

11. A mold for fabricating a radio frequency (RF) coil for use within a plasma processing apparatus, the mold comprising:
a cylindrical inner core having a first helically shaped groove formed within an outer surface of the cylindrical inner core; and
a two-piece compression sleeve having a second helically shaped groove formed within an inner surface of the two-piece compression sleeve, wherein when portions of the two-piece compression sleeve are attached together, the two-piece compression sleeve is configured to surround the cylindrical inner core and provide a compressive force to a conductor arranged within the first and second helically shaped grooves to fabricate the RF coil, wherein the conductor comprises copper or aluminum.

12. The mold of claim 11, wherein the two-piece compression sleeve comprises a first portion and a second portion, which is removably attached to the first portion with one or more mechanical fasteners.

13. The mold of claim 11, wherein the two-piece compression sleeve comprises cope and drag compression sleeves which facilitate a negative shape of the RF coil to be formed.

14. The mold of claim 11, wherein the cylindrical inner core comprises a height between ⅝ inch and 8 inches and a diameter between 1 inch and 24 inches.

15. The mold of claim 11, wherein the first and second helically shaped grooves each comprise a number of turns between 1 and 100 and a pitch between ⅝ inch and 2 inches.

* * * * *